US012560752B2

(12) United States Patent　(10) Patent No.: US 12,560,752 B2
Zhu et al.　(45) Date of Patent: Feb. 24, 2026

(54) INDUCTION-TYPE PANEL LAMP AND LIGHTING SYSTEM

(71) Applicant: ZHEJIANG TWINSEL ELECTRONIC TECHNOLOGY CO., LTD., Ningbo (CN)

(72) Inventors: Bin Zhu, Ningbo (CN); Anjun Zhang, Ningbo (CN); Xueren Zeng, Ningbo (CN); Qian Xu, Ningbo (CN); Yanping Liu, Ningbo (CN); Ping Rao, Ningbo (CN)

(73) Assignee: ZHEJIANG TWINSEL ELECTRONIC TECHNOLOGY CO., LTD., Ningbo (CN)

( * ) Notice: Subject to any disclaimer, the term of this patent is extended or adjusted under 35 U.S.C. 154(b) by 258 days.

(21) Appl. No.: 18/593,228

(22) Filed: Mar. 1, 2024

(65) Prior Publication Data

US 2024/0411080 A1　Dec. 12, 2024

(30) Foreign Application Priority Data

Jun. 9, 2023　(CN) .......................... 202321474122.5

(51) Int. Cl.
*F21V 8/00*　(2006.01)
(52) U.S. Cl.
CPC ................................. *G02B 6/0083* (2013.01)

(58) Field of Classification Search
CPC .................................................... G02B 6/0083
See application file for complete search history.

(56) References Cited

FOREIGN PATENT DOCUMENTS

| CN | 203686657 | * | 7/2014 |
| CN | 205568375 | * | 9/2016 |
| CN | 206592921 | * | 10/2017 |
| CN | 206708863 | * | 12/2017 |
| CN | 219571739 | * | 8/2023 |

* cited by examiner

*Primary Examiner* — Mary Ellen Bowman
(74) *Attorney, Agent, or Firm* — Tyler Sisk; Casimir Jones SC

(57)　ABSTRACT

An induction-type panel lamp and a lighting system are provided. The induction-type panel lamp includes a fixing frame, a light source component, and a sensing element, wherein the fixing frame is provided with a through space, an accommodating groove, and a second guide hole, the second guide hole communicates with the accommodating groove, the light source component is accommodated in the through space, the sensing element includes a detecting portion and a conducting portion which are connected to each other, the conducting portion penetrates the second guide hole and extends into the accommodating groove, the conducting portion is electrically connected to the light source component, and the detecting portion is arranged outside the fixing frame.

20 Claims, 2 Drawing Sheets

<u>100</u>

100

123

1231

INDUCTION-TYPE PANEL LAMP AND LIGHTING SYSTEM

TECHNICAL FIELD

The present disclosure relates to the field of lighting furniture, and in particular to an induction-type panel lamp and a lighting system.

BACKGROUND ART

The appearance of an induction-type panel lamp can improve the intelligent level of the panel lamp, and control on and off of a lamp source by sensing a human body approaching or moving away.

The induction-type panel lamp requires wiring between light source component and sensing element. Most connecting wire harness in the prior art are open wires, which have the problem that the aesthetics is affected and it is easily damaged by foreign objects.

SUMMARY

The present disclosure provides an induction-type panel lamp and a lighting system, which can improve aesthetic degree of a connecting wire between light source component and sensing element, and also can avoid the problem of being damaged due to the influence of foreign objects.

Embodiments of the present disclosure can be implemented as follows.

The embodiments of the present disclosure provide an induction-type panel lamp, which includes:

a fixing frame, a light source component, and a sensing element;

herein, the fixing frame is provided with a through space, an accommodating groove and a second guide hole, and the second guide hole communicates with the accommodating groove; the light source component is accommodated in the through space; and the sensing element includes a detecting portion and a conducting portion which are connected to each other, wherein the conducting portion penetrates the second guide hole and extends into the accommodating groove, the conducting portion is electrically connected to the light source component, and the detecting portion is arranged outside the fixing frame.

Optionally, the fixing frame is provided with a first guide hole, and the first guide hole is configured to communicate with the through space and the accommodating groove.

Optionally, the fixing frame further includes a limiting plate, and the limiting plate is connected to a bottom side of the fixing frame.

Optionally, the light source component includes a driving member and a light source plate, both the driving member and the light source plate are accommodated in the through space, and the driving member is electrically connected to both the conducting portion and the light source plate.

Optionally, the light source component further includes an isolating bar, a clamping groove is formed on the isolating bar, and the light source plate is accommodated in the clamping groove.

Optionally, the clamping groove is U-shaped, and an orientation of a U-shaped opening of the clamping groove is consistent with an extending direction from the accommodating groove to the through space.

Optionally, the light source component further includes a driving shell, and the driving shell is accommodated in the through space, and the driving shell covers the driving member.

Optionally, the induction-type panel lamp further includes a fixing bracket, and the fixing bracket is connected to a top side of a multi-layer plate set.

Optionally, the multi-layer plate set includes a back plate, a filling plate, a reflective plate, a light guide plate, and a diffusion plate that are sequentially arranged, and the light source component is arranged between the reflective plate and the light guide plate.

Embodiments of the present disclosure further provide a lighting system, including the induction-type panel lamp.

The induction-type panel lamp and the lighting system in the embodiments of the present disclosure have the beneficial effects including, for example:

the induction-type panel lamp includes the fixing frame, the light source component, and the sensing element. In the above, the fixing frame is provided with the through space, the accommodating groove, and the second guide hole. The second guide hole communicates with the accommodating groove. The light source component is accommodated in the through space. The sensing element includes a detecting portion and a conducting portion which are connected to each other. The conducting portion penetrates the second guide hole and extends into the accommodating groove. The conducting portion is electrically connected to the light source component. The detecting portion is arranged outside the fixing frame. For the induction-type panel lamp, by forming the accommodating groove on the fixing frame, a connecting wire harness between the conducting portion and the light source component can be arranged in the accommodating groove, thereby reducing arrangement of open wires, improving the aesthetic degree of the wiring to a certain extent, and further the problem that the wiring is damaged due to the influence of foreign objects can be reduced.

The lighting system includes the induction-type panel lamp, and has all the functions of the induction-type panel lamp.

BRIEF DESCRIPTION OF DRAWINGS

In order to more clearly illustrate technical solutions of embodiments of the present disclosure, drawings which need to be used in the embodiments will be introduced briefly below. It should be understood that the drawings below merely show some embodiments of the present disclosure, and therefore should not be considered as limitation to the scope. Those ordinarily skilled in the art still could obtain other relevant drawings according to these drawings, without using any inventive efforts.

REFERENCE SIGNS

Figure 1:
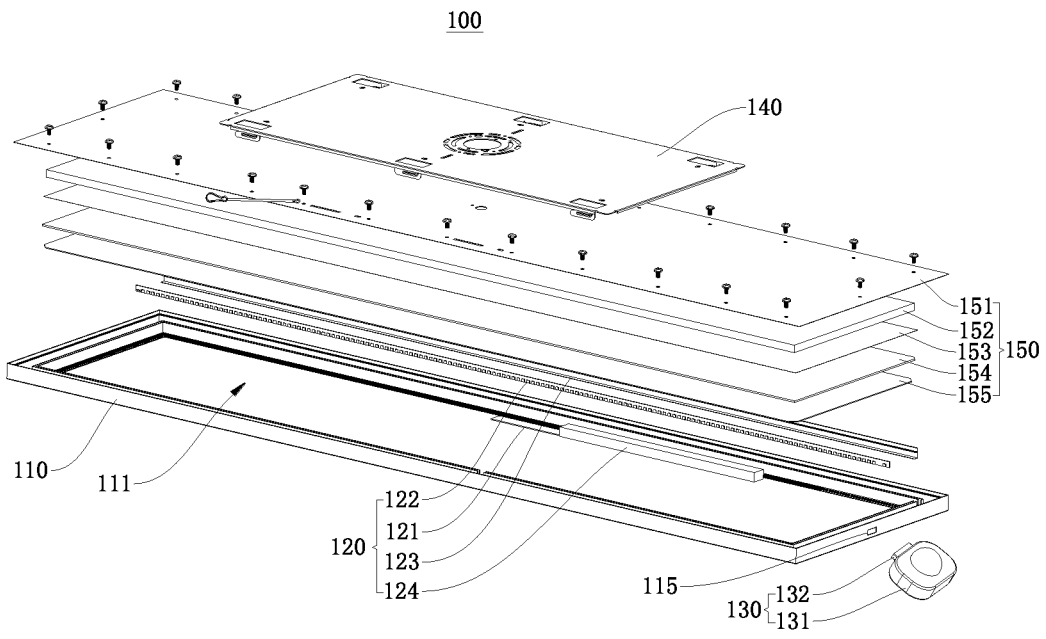
FIG. 1 is an exploded schematic diagram of an induction-type panel lamp provided in the embodiments of the present disclosure.

100—induction-type panel lamp; 110—fixing frame; 111—through space; 112—accommodating groove; 113— first guide hole; 114—limiting plate; 115—second guide hole; 120—light source component; 121—driving member; 122—light source plate; 123—isolating bar; 1231—clamping groove; 124—driving shell; 130—sensing element; 131—detecting portion; 132—conducting portion; 140—fixing bracket; 150—multi-layer plate set; 151—back plate; 152—filling plate; 153—reflective plate; 154—light guide plate; 155—diffusion plate.

DETAILED DESCRIPTION OF EMBODIMENTS

In order to make objectives, technical solutions, and advantages of the embodiments of the present disclosure clearer, the technical solutions in the embodiments of the present disclosure are described clearly and completely below in conjunction with the drawings in the embodiments of the present disclosure. Apparently, some but not all embodiments of the present disclosure are described. Generally, components in the embodiments of the present disclosure described and shown in the drawings herein may be arranged and designed in different configurations.

Therefore, the detailed description below of the embodiments of the present disclosure provided in the drawings is not intended to limit the scope of protection of the present disclosure, but merely represents chosen embodiments of the present disclosure. Based on the embodiments in the present disclosure, all of other embodiments obtained by those ordinarily skilled in the art without using any inventive efforts shall fall within the scope of protection of the present disclosure.

It should be noted that similar reference signs and letters represent similar items in the following drawings; therefore, once a certain item is defined in one drawing, it is not needed to be defined or explained in subsequent drawings.

In the description of the present disclosure, it should be indicated that orientation or positional relationships indicated by terms such as "upper", "lower", "inner", and "outer", if appear, are based on orientation or positional relationships as shown in the drawings, or orientation or positional relationships of a product of the present disclosure when being conventionally placed in use, merely for facilitating describing the present disclosure and simplifying the description, rather than indicating or implying that related devices or elements have to be in the specific orientation or configured and operated in a specific orientation, therefore, they should not be construed as limitation to the present disclosure.

Besides, terms such as "first" and "second", if appear, are merely for distinguishing the description, but should not be construed as indicating or implying importance in the relativity.

The terms "include", "comprise", or any other variants thereof are intended to cover non-exclusive inclusion, so that a process, method, article or device that includes a series of elements includes not only those elements, but also other elements that are not explicitly listed, or elements inherent to such process, method, article, or device. Without more restrictions, an element defined with wordings "including a . . ." does not exclude presence of other same elements in the process, method, article or device including the element.

Unless otherwise expressly specified and defined, the terms such as "provide" and "connect" shall be construed in a broad sense. For example, the term "connect" may refer to fixed connection, or detachable connection, or integrated connection; it may refer to mechanical connection, or electrical connection; or it may refer to direct connection, or indirect connection via an intermediary, or inner communication between two elements. For those ordinarily skilled in the art, specific meanings of the above-mentioned terms in the present disclosure can be understood according to specific circumstances.

It should be noted that the features in the embodiments of the present disclosure may be combined with each other without conflict.

The appearance of the induction-type panel lamp can improve the intelligent level of the panel lamp, and control on and off of a lamp source by sensing a human body approaching or moving away. The inventors found through researches that the induction-type panel lamp needs to connect light source component and sensing element. Most connecting wire harness in the prior art are open wires, which have the problem that the aesthetics is affected and it is easily damaged by foreign objects.

Figure 2:
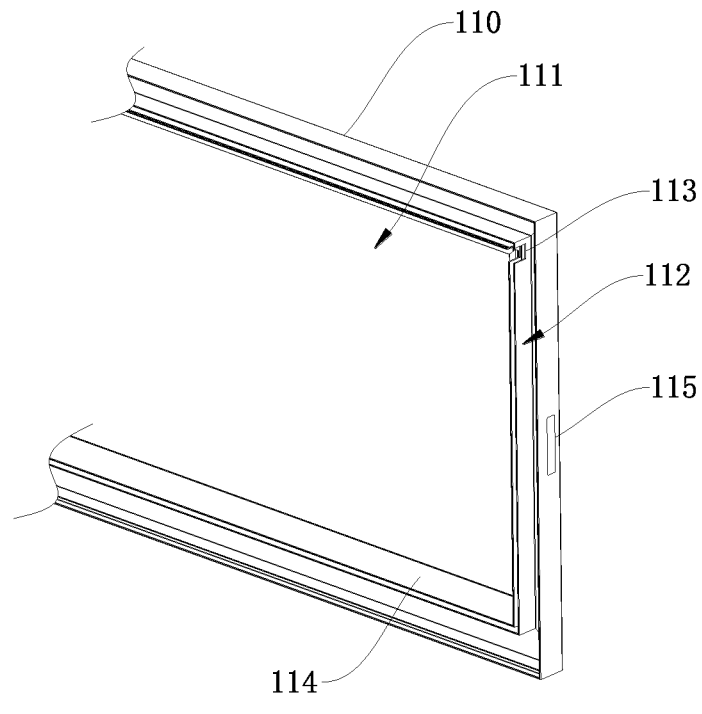
FIG. 2 is a schematic diagram of positions of an accommodating groove and a limiting plate provided in the embodiments of the present disclosure.
Figure 3:
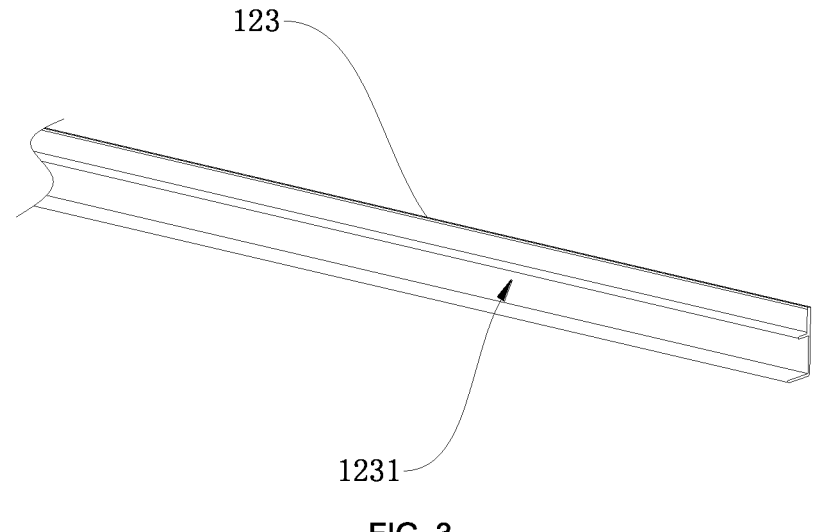
FIG. 3 is a structural schematic diagram of an isolating bar provided in embodiments of the present disclosure.

Referring to FIG. 1 to FIG. 3, an induction-type panel lamp 100 and a lighting system provided in the embodiments of the present disclosure can solve the above problems, which will be described in detail below.

Referring to FIG. 1 and FIG. 2, the induction-type panel lamp 100 includes a fixing frame 110, a light source component 120, and a sensing element 130. In the above, the fixing frame 110 is provided with a through space 111, an accommodating groove 112, and a second guide hole 115. The second guide hole 115 communicates with the accommodating groove 112. The light source component 120 is accommodated in the through space 111. The sensing element 130 includes a detecting portion 131 and a conducting portion 132 which are connected to each other. The conducting portion 132 penetrates the second guide hole 115 and extends into the accommodating groove 112. The conducting portion 132 is electrically connected to the light source component 120. The detecting portion 131 is arranged outside the fixing frame 110.

For the induction-type panel lamp 100, by providing the accommodating groove 112 on the fixing frame 110, a connecting wire harness between the conducting portion 132 and the light source component 120 can be arranged in the accommodating groove 112, thereby reducing arrangement of open wires, improving the aesthetic degree of the wiring to a certain extent, and further the problem that the wiring is damaged due to the influence of foreign objects can be reduced.

Specifically, the fixing frame 110 is of a rectangular-ambulatory-plane structure (concentric rectangular structure), the through space 111 is formed at a center of the rectangular-ambulatory-plane of the fixing frame 110, the accommodating groove 112 is formed around the through space 111, and the fixing frame 110 may have a certain limiting and protecting effect on the light source component 120.

It is noted that, in order to ensure detection precision of the detecting portion 131, an orientation of the detecting portion 131 may be inclined by a certain angle relative to the fixing frame 110, so as to facilitate sensing a human body approaching from all directions, or sensing a human body moving away in all directions.

Referring to FIG. 1, the induction-type panel lamp 100 further includes a multi-layer plate set 150. The multi-layer plate set 150 includes a back plate 151, a filling plate 152, a reflective plate 153, a light guide plate 154, and a diffusion plate 155 that are sequentially arranged. The back plate 151, the filling plate 152, the reflective plate 153, the light guide plate 154, and the diffusion plate 155 are all accommodated in the through space 111. The light source component 120 is arranged between the reflective plate 153 and the light guide plate 154.

In the above technical solution, the multi-layer plate set 150 is provided, which is conveniently cooperate with the fixing frame 110 and the light source component 120 to form the panel lamp.

Specifically, the back plate 151 is generally arranged on a top side of the multi-layer plate set 150, and the back plate 151 is generally provided with a through hole or a screw hole for achieving a connection effect, which facilitates the penetration of a fastener to achieve a fastening effect. The filling plate 152 is filled with a pearl cotton material and has a certain thickness for an isolating effect, and meanwhile can make the fastener penetrating the back plate 151 connect to the filling plate 152. The reflective plate 153 is located on an upper side of the light source component 120, for reflecting light generated by the light source component 120. The light guide plate 154 is located on a lower side of the light source component 120, for conducting the light generated by the light source component 120. The diffusion plate 155 is configured to conduct and diffuse the light conducted by the light guide plate 154, so as to increase an illumination area of the overall induction-type panel lamp 100.

Moreover, edges of the back plate 151, the filling plate 152, the reflective plate 153, the light guide plate 154, and the diffusion plate 155 are all tightly clamped with side walls of the fixing frame 110 that form the through space 111, thereby preventing the multi-layer plate set 150 from being easily disengaged from the fixing frame 110.

Referring to FIG. 1, the induction-type panel lamp 100 further includes a fixing bracket 140. The fixing bracket 140 is connected to a side of the back plate 151 away from the filling plate 152.

In the above technical solution, by providing the fixing bracket 140, it is convenient to connect the back plate 151 to a top surface of an indoor wall.

Referring to FIG. 1, at least two bearing hooks are formed on the fixing bracket 140 by stamping, and strip-shaped holes fitted with the bearing hooks are formed on the back plate 151, then the bearing hooks can be extended into the strip-shaped holes, so that the bearing hooks bear the back plate 151. Specifically, the bearing hook is L-shaped.

In the present embodiment, the shape of the fixing bracket 140 projected on the back plate 151 may be a square, the number of the bearing hooks is four, and the bearing hooks are respectively provided at four corners of the fixing bracket 140.

Certainly, in other embodiments of the present disclosure, the shape of the fixing bracket 140 projected on the back plate 151 may also be a circle, a triangle, a rhombus, or other shapes, and the number of the bearing hooks may also be two, three, five, or the like. A specific shape of the fixing bracket 140 projected on the back plate 151 and a specific number of the bearing hooks are not limited.

It is noted that it is also possible to connect a hook to a top side of the back plate 151. The hook may extend out from between the back plate 151 and the fixing bracket 140, so as to facilitate hanging the induction-type panel lamp 100 during overall transportation. Certainly, it is also possible to make the hook penetrate the fixing bracket 140 at the same time, so that it is convenient to extend out from the top side of the fixing bracket 140. The hanging arrangement of the overall induction-type panel lamp 100 is realized through the hook.

With reference to FIG. 1 and FIG. 2, the fixing frame 110 is provided with a first guide hole 113, and the first guide hole 113 is configured to communicate with the through space 111 and the accommodating groove 112.

In the above technical solutions, by forming the first guide hole 113, the through space 111 and the accommodating groove 112 can be communicated directly through the first guide hole 113, so that it is convenient to arrange the wire harness between the light source component 120 and the conducting portion 132, which helps to reduce a wiring path.

Referring to FIG. 2, the fixing frame 110 further includes a limiting plate 114, and the limiting plate 114 is connected to a bottom side of the fixing frame 110. Specifically, the limiting plate 114 is in contact with the diffusion plate 155.

In the above technical solution, a limiting plate 114 is provided, which can have a certain limiting and supporting effect on the diffusion plate 155, avoiding the diffusion plate 155 from being easily disengaged from plate members such as the light guide plate 154.

Referring to FIG. 1, the light source component 120 includes a driving member 121 and a light source plate 122, both the driving member 121 and the light source plate 122 are accommodated in the through space 111, and the driving member 121 is electrically connected to both the conducting portion 132 and the light source plate 122. Specifically, both the driving member 121 and the light source plate 122 are disposed between the light guide plate 154 and the light reflective plate 153.

In the above technical solution, the driving member 121 controls on and off of the light source plate 122 through electrical connection with the conducting portion 132.

Referring to FIG. 1 and FIG. 3, the light source component 120 further includes an isolating bar 123, a clamping groove 1231 is formed on the isolating bar 123, and the light source plate 122 is accommodated in the clamping groove 1231. The clamping groove 1231 is U-shaped, and an orientation of a U-shaped opening of the clamping groove 1231 is consistent with an extending direction from the accommodating groove 112 to the through space 111.

The clamping groove 1231 can clamp and fix the light source plate 122, and function to isolate the light source plate 122 and the accommodation groove 112, thereby preventing light generated by the light source plate 122 from adversely affecting wiring in the accommodation groove 112 while ensuring positional stability of the light source plate 122.

Referring to FIG. 1, the light source component 120 further includes a driving shell 124. The driving shell 124 is accommodated in the through space 111, and the driving shell 124 covers the driving member 121. By providing the driving shell 124, the driving member 121 can be shielded and protected.

Embodiments of the present disclosure further provide a lighting system, including the above induction-type panel lamp 100, and further including a switch device, an emergency alarm device, and a controller. The switch device is configured to control on and off of power supply. The emergency alarm device is configured to generate an alarm signal when a short circuit starts or during the short circuit. The controller is configured to communicate with various electrical elements, and convert and calculate input and output signals between various elements.

The controller may be a single chip microcomputer of STM-32 series, and may also be a PLC, configured to write programs to realize intelligent control of various elements, thereby realizing an automatic lighting operation of the lighting system.

The above-mentioned are merely specific embodiments of the present disclosure, but the scope of protection of the present disclosure is not limited thereto. Any change or substitution that could be easily conceived by any skilled person familiar with the present art within the technical scope disclosed in the present disclosure should fall within the scope of protection of the present disclosure. Therefore, the scope of protection of the present disclosure should be determined by the scope of protection of the claims.

What is claimed is:

1. An induction-type panel lamp, comprising:
   a fixing frame, a light source component, and a sensing element,
   wherein the fixing frame is provided with a through space, an accommodating groove and a second guide hole, and the second guide hole communicates with the accommodating groove; the light source component is accommodated in the through space; and the sensing element comprises a detecting portion and a conducting portion which are connected to each other, wherein the conducting portion penetrates the second guide hole and extends into the accommodating groove, the conducting portion is electrically connected to the light source component, and the detecting portion is arranged outside the fixing frame.

2. The induction-type panel lamp according to claim 1, wherein the fixing frame is provided with a first guide hole, and the first guide hole is configured to communicate with the through space and the accommodating groove.

3. The induction-type panel lamp according to claim 1, wherein the fixing frame further comprises a limiting plate, and the limiting plate is connected to a bottom side of the fixing frame.

4. The induction-type panel lamp according to claim 1, wherein the light source component comprises a driving member and a light source plate, both the driving member and the light source plate are accommodated in the through space, and the driving member is electrically connected to both the conducting portion and the light source plate.

5. The induction-type panel lamp according to claim 4, wherein the light source component further comprises an isolating bar, a clamping groove is formed on the isolating bar, and the light source plate is accommodated in the clamping groove.

6. The induction-type panel lamp according to claim 5, wherein the clamping groove is U-shaped, and an orientation of a U-shaped opening of the clamping groove is consistent with an extending direction from the accommodating groove to the through space.

7. The induction-type panel lamp according to claim 4, wherein the light source component further comprises a driving shell, and the driving shell is accommodated in the through space, and the driving shell covers the driving member.

8. The induction-type panel lamp according to claim 1, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

9. The induction-type panel lamp according to claim 8, further comprising a fixing bracket, wherein the fixing bracket is connected to a side of the back plate away from the filling plate.

10. A lighting system, comprising the induction-type panel lamp according to claim 1.

11. The induction-type panel lamp according to claim 2, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

12. The induction-type panel lamp according to claim 3, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

13. The induction-type panel lamp according to claim 4, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

14. The induction-type panel lamp according to claim 5, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

15. The induction-type panel lamp according to claim 6, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

16. The induction-type panel lamp according to claim 7, further comprising a multi-layer plate set, wherein the multi-layer plate set comprises a back plate, a filling plate, a reflective plate, a light guide plate, and a diffusion plate that are sequentially arranged, wherein the back plate, the filling plate, the reflective plate, the light guide plate, and the diffusion plate are all accommodated in the through space, and the light source component is arranged between the reflective plate and the light guide plate.

17. The lighting system according to claim 10, wherein the fixing frame is provided with a first guide hole, and the first guide hole is configured to communicate with the through space and the accommodating groove.

18. The lighting system according to claim 10, wherein the fixing frame further comprises a limiting plate, and the limiting plate is connected to a bottom side of the fixing frame.

19. The lighting system according to claim 10, wherein the light source component comprises a driving member and a light source plate, both the driving member and the light source plate are accommodated in the through space, and the driving member is electrically connected to both the conducting portion and the light source plate.

20. The lighting system according to claim 19, wherein the light source component further comprises an isolating bar, a clamping groove is formed on the isolating bar, and the light source plate is accommodated in the clamping groove.

\* \* \* \* \*